Figure 1:
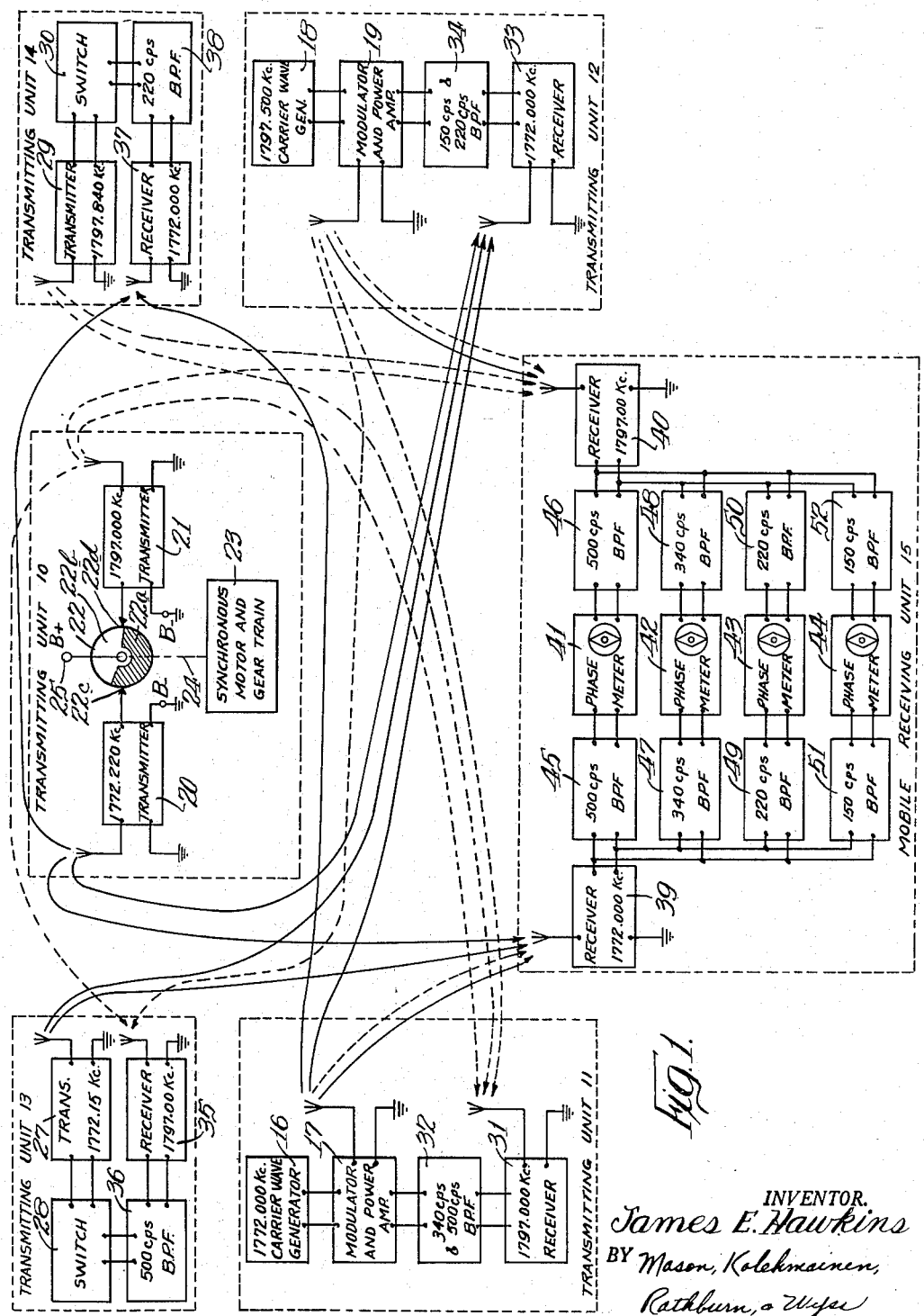

June 14, 1955

J. E. HAWKINS 2,710,961

RADIO LOCATION SYSTEM

Filed June 26, 1953

2 Sheets-Sheet 1

INVENTOR.
James E. Hawkins
BY Mason, Kolehmainen,
Rathburn, & Wyss
Attys

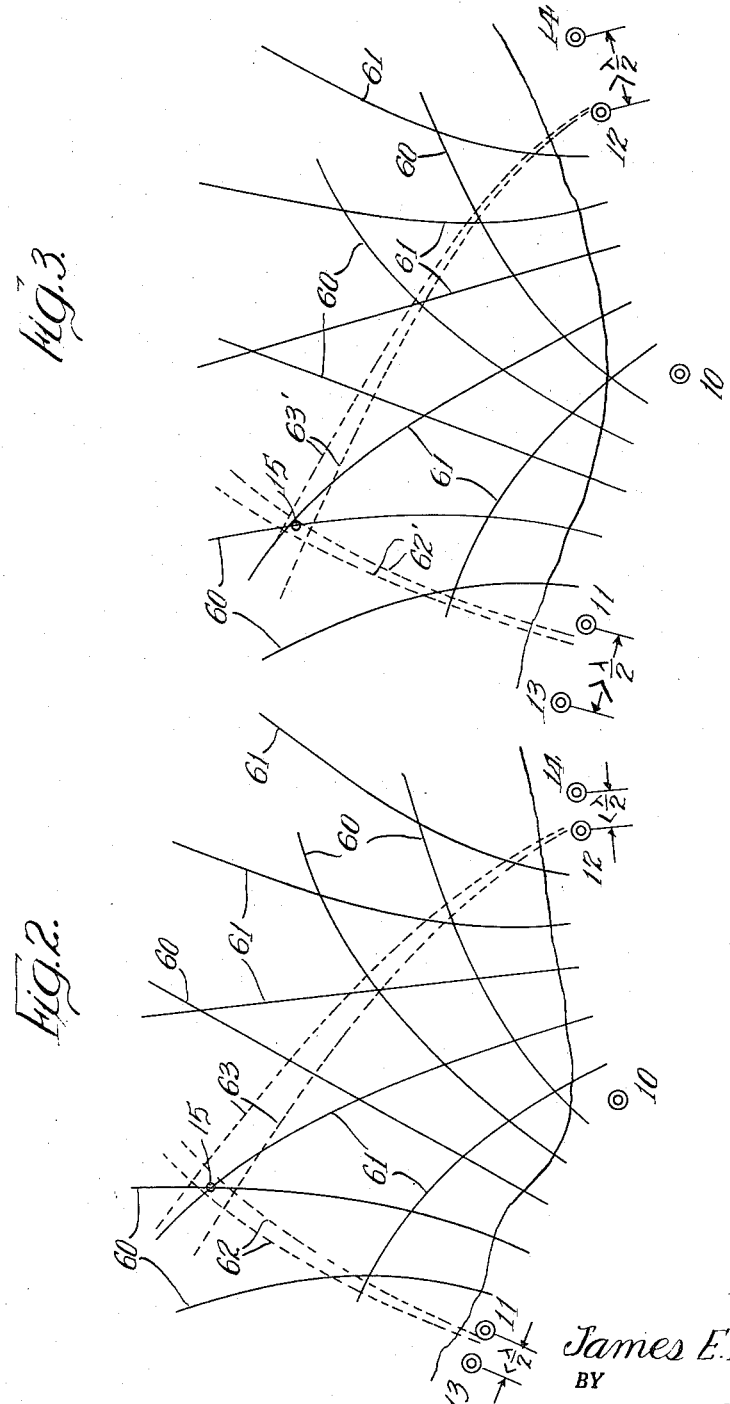

United States Patent Office 2,710,961
Patented June 14, 1955

2,710,961
RADIO LOCATION SYSTEM

James E. Hawkins, Broken Arrow, Okla., assignor to Seismograph Service Corporation, Tulsa, Okla., a corporation of Delaware Application June 26, 1953, Serial No. 364,243

26 Claims. (Cl. 343—105)

The present invention relates to radio position finding systems and more particularly to improvements in radio position finding systems of the type employing phase comparison in pairs of position indication signals radiated from a plurality of spaced transmitting points to provide indications from which the position of mobile receiving point relative to the known positions of the transmitting points may be determined.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by isophase lines which are hyperbolic in contour about the transmitting points as foci. On a line bisecting the pair of transmitters, these isophase lines are spaced apart a distance equal to one-half the mean wave length of the radiated waves and have diverging spacings at points on either side of this line. With this system arrangement, the position of a receiving point relative to a pair of hyperbolic isophase lines may be determined by measuring the phase relationship between continuous waves radiated from the pair of transmitters.

Since the point of location of the receiving point along the zone separating the two isophase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or alternatively, so to arrange the system that phase shifts between the radiated waves are compensated during the phase comparing operation.

Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of service required in position determining systems. To obviate this problem, systems of the continuous wave hyperbolic type have been proposed (see Honore Patent No. 2,148,267) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of equiphase lines.

While the described arrangement for obviating the phase synchronization problem is entirely satisfactory, it entails the use of two carrier channels in addition to the three or four channels taken up by the three or four continuously operating survey transmitters, in order to make up a complete system.

An improved arrangement for eliminating the link transmitters without eliminating the functions thereof is disclosed and broadly claimed in Hawkins and Finn Patent No. 2,513,317 wherein a pair of transmitters are alternately operated as link transmitters and as position signal transmitters. In the practice of the system described in the above identified Hawkins and Finn patent, it is desirable that the channel frequencies be located adjacent the broadcast band or at least below the ultra-high frequency band in order to obviate the problem of line-of-sight transmission, which of course necessitates the location of a number of channel frequencies in the most crowded portion of the frequency spectrum, at least insofar as operations in the United States are concerned. It is apparent that frequency allocations in this band must be maintained at a minimum, and, therefore, a practicable system for providing radio position determinations must be concerned with the problem of economizing in the number of frequency channels employed.

Another problem encountered in the operation of continuous wave systems is that of eliminating ambiguity from the phase measurements which provide the desired position information. Thus while the two phase measurements identify the position of the receiving station relative to two intersecting pairs of hyperbolic isophase lines, they do not indicate the particular pairs of lines to which the indications are related. This means that in operating the system the geographic location of the receiving system must be known at the start of movement of the receiving system relative to the transmitting stations and, furthermore, that the successive wave lengths must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

In a copending application Serial No. 138,235 filed January 12, 1950, now Patent No. 2,652,558, granted September 15, 1953, entitled Radio Location System and assigned to the same assignee as the present invention, there is disclosed an improved radio location system of the continuous wave type which is free not only of phase synchronization difficulties but also of ambiguity problems. In the system of the said copending application, position indications are obtained having different sensitivities, termed phase sensitivities, insofar as the spacing of the isophase lines is concerned. More specifically, a plurality of low phase sensitivity position indications and a plurality of high phase sensitivity position indications are obtained, the low phase sensitivity indications being effective to locate the range of the high phase sensitivity indications and being characterized by widely spaced phase coincidences and the high phase sensitivity indications being characterized by closely spaced phase coincidences. The high and low phase sensitivity indications are obtained by producing pairs of beat frequency signals in accordance with the principles of the Honore system and then heterodyning these beat frequency signals to produce position indicating and reference signals for phase comparison which have phase sensitivities determined by phantom frequencies corresponding to the sum of or difference between the mean frequencies of the carrier waves from which the pairs of beat frequency signals were derived.

While this latter system completely solves the ambiguity problem, a considerable number of transmitters and carrier channels are required and a number of narrow band pass filters must be employed to separate the various position indicating and reference signals, which adds to the expense and may cause phase shift difficulties unless the band pass filters are carefully selected and balanced. In United States Patent 2,629,091 entitled Radio Location System, issued February 17, 1953, there is disclosed and claimed an improved radio location system of the continuous wave type which is free of phase synchronization difficulties of the character mentioned, in which the above mentioned disadvantages pertaining to ambiguity are entirely obviated, and in which the use of narrow band pass filters is minimized or eliminated.

In one embodiment of the invention disclosed in the latter copending application, narrow band pass filters are entirely eliminated, but a rather large number of different frequency carrier channels are required to provide the necessary position indicating signals and reference signal carriers, and in another embodiment a reduction in the number of frequencies requires the modulation of a plurality of reference signals on common carriers and the utilization of narrow band pass filters at the mobile receiving unit.

In accordance with the present invention a completely non-ambiguous system is obtained which employs a minimum number of channel frequencies and at the same time eliminates the use of excessively narrow band pass filters in the signal circuits and also reduces the number of reference signals which are required to be modulated on a carrier at any one time. It is therefore an object of the present invention to provide an improved radio location system of the continuous wave type which is free of phase synchronization difficulties of the character mentioned, in which the above mentioned disadvantages pertaining to ambiguity are entirely obviated and in which the use of exceedingly narrow band pass filters is minimized or eliminated.

It is another object of the present invention to provide an improved radio location system of the continuous wave type which is free of phase synchronization difficulties, in which certain of the position indications obtained have different sensitivities insofar as the spacing of the isophase lines is concerned, which will be referred to hereinafter as phase sensitivity, and in which the number of carrier channels employed is minimized.

It is a further object of the present invention to provide a radio position finding system of the character described combining economy of frequencies with precise, non-ambiguous position determinations.

It is a still further object of the invention to provide a radio position finding system of the character described in which a plurality of low phase sensitivity position indications and high phase sensitivity position indications are obtained, the low phase sensitivity indications being effective to locate the range of the high phase sensitivity indications and being characterized by widely spaced phase coincidences, and the high phase sensitivity indications being characterized by closely spaced phase coincidences.

Still another object of the invention is to provide a radio position indicating system of the character described wherein such high phase sensitivity and low phase sensitivity position indications are obtained while employing a minimum number of carrier frequencies suitable for efficient, long-range propagation.

It is likewise an object of the present invention to provide improved transmission systems for use in radio location systems of the above-indicated character.

It is also an object of the invention to provide improved receiving equipment for use in radio location systems of the above-indicated character.

The invention, both as to its organization and method of operation, together with further objects and advantages thereof, will best be understood by reference to the specification taken in conjunction with the accompanying drawings in which:

Fig. 1 diagrammatically illustrates the component elements constituting the transmitting and receiving units employed in one embodiment of a system characterized by the features of the present invention;

Fig. 2 is a pictorial representation of an area over which survey operations are to be performed, illustrating the positional arrangement of the transmitting units embodied in the system and the grid system of hyperbolic isophase lines formed in space by the signals radiated from these units including hyperbolic lines having widely spaced phase coincidences as well as a hyperbolic pattern characterized by relatively closely spaced lines; and Fig. 3 is a view similar to Fig. 2 illustrating the variations in divergence of the hyperbolic lines effected by alteration of the positional arrangement of the transmitters.

Referring now to the drawings and more particularly to Fig. 1 thereof, the present invention is there illustrated as embodied in a system for providing position information at a mobile receiving unit 15 which may be carried by a vessel or vehicle operating within the radius of transmission of five spaced transmitting units 10, 11, 12, 13 and 14. The transmitting unit 10 is preferably spaced at approximately equal and relatively large distances from the transmitting units 11 and 12 and these three units are so positioned that the line bisecting the points of location of the units 10 and 11 is angularly related to the line bisecting the points of location of the units 10 and 12. The transmitting units 13 and 14, on the other hand, are spaced relatively small distances from the transmitting units 11 and 12, respectively. As described more fully below, the transmitting units 11 and 12 are equipped continuously to radiate position indicating signals in the form of carrier waves of different frequencies, whereas the transmitting unit 10 is equipped alternately to radiate two additional position indicating signals in the form of carrier waves of still different frequencies and the transmitting units 13 and 14 are equipped intermittently to radiate carrier waves of even different frequencies. Specifically, the transmitter embodied in the unit 11 comprises a carrier wave generator or oscillator 16 and a modulator and power amplifier unit 17. Similarly the transmitter embodied in the unit 12 comprises a carrier wave generator or oscillator 18 and a modulator and power amplifier unit 19. The transmitter embodied in the unit 13 comprises a transmitter circuit 27 and a control switch 28 for intermittently de-energizing the transmitter circuit 27 and the transmitting unit 14 embodies a transmitter circuit 29 and a control switch 30 for intermittently deenergizing the transmitter 29 in a manner which will become evident as the description proceeds. The transmitting unit 10 comprises two transmitters 20 and 21 for respectively radiating position indicating carrier waves at two different carrier frequencies together with switching means for alternately rendering these two transmitters operative. In the arrangement illustrated, keying of the two transmitters 20 and 21 for alternate operation is accomplished by alternately feeding anode current to the electron discharge tubes of the respective transmitters from the positive terminal 25 of an anode current source, not shown, through a commutating ring 22 which is shaft connected by means of the shaft 24 to be driven at constant speed by a synchronous motor and gear train unit 23. More specifically, the positive terminal 25 of the anode current source is connected to the conductive segment 22b of the commutating ring 22 which segment spans slightly less than one-half the circumference of the ring, the remainder of the ring comprising an insulating segment 22a. At diametrically opposed points around the circumference of the ring, brushes 22c and 22d are provided which engage the ring periphery. These brushes are respectively connected to the positive bus conductors of the two transmitters 20 and 21 whereby anode current is alternately delivered to the electron discharge tubes of these transmitters. Since the conductive segment 22b of the ring 22 represents slightly less than one-half the peripheral surface of the ring, it will be understood that a short off-signal period is provided between successive periods during which the transmitters 20 and 21 are alternately operative thus preventing simultaneous radiation of waves by both transmitters. The periodicity with which the two transmitters 20 and 21 are alternately operated is, of course, dependent upon the speed of rotation of the commutating ring 22. Preferably this ring is driven at a speed of one revolution per second so that the transmitters 20 and 21 are each rendered operative at one-half second intervals. In order to illustrate the action which occurs, arrow pointed solid lines have been shown in Fig. 1 of the drawings to indicate the receiving points of signal acceptance and the sources of the accepted signals during each period when the transmitter 20 is operating, and arrow pointed dashed lines have been shown to illustrate the receiving points of signal acceptance and the sources of accepted signals during each period when the transmitter 21 is operating.

As indicated above the carrier frequencies at which the six transmitters of the five transmitting units 10, 11, 12, 13 and 14 operate are all different. Preferably, however, these carrier waves are grouped so that the frequencies of each group of three waves are well within a single channel allocation of 10 kilocycles, as specified by the Federal Communications Commission of the United States Government. To this end the output frequency of the transmitter 20, the output frequency of the transmitter of the unit 11 and the output frequency of the transmitter of the unit 13, forming the first transmitter group, may be 1772.220, 1772.000 and 1772.150 kilocycles, respectively. Thus the difference frequency between the transmitter 20 and the transmitter of the unit 11 is 220 cycles and the difference frequency between the transmitter of the unit 11 and the transmitter of the unit 13 is 150 cycles. The output frequencies of the transmitter 21, the transmitter of the unit 12 and the transmitter of the unit 14, forming the second transmitter group, may be 1797.000, 1797.500 and 1797.840 kilocycles, respectively, whereby the difference frequency between the transmitter 21 and the transmitter of the unit 12 is 500 cycles and the difference frequency between the transmitter of the unit 12 and the transmitter of the unit 14 is 340 cycles. It will be noted that the channels in which the two groups of carrier frequencies fall are separated in the frequency spectrum by approximately 25 kilocycles, thus facilitating selective reception of these carrier groups in the manner more fully explained below. The power of the six transmitters is such that the entire area in which position information may be desired aboard the vehicle or vessel carrying the receiving unit 15 is blanketed with waves radiated from each of the six transmitters and that these waves have a field strength at all points within this area sufficient to permit reliable reception without requiring undue sensitivity of the receiving equipment.

In order to obviate the above mentioned difficulties attendant upon phase synchronization of the position indicating carrier waves radiated by the six transmitters while at the same time eliminating the necessity for utilizing additional frequency channels, means are provided at the transmitting units 11 and 12 for alternately modulating the waves radiated by the transmitters of the units 11 and 12 with signals representative of the difference frequencies between the individual pairs of waves constituting each carrier wave group. These reference signals may be received at any receiving point as, for example, at the mobile receiving unit 15 located within the radius of transmission of the six transmitters. The equipment for this purpose as provided at the transmitting unit 11 comprises a fixed tuned amplitude modulation receiver 31, center tuned to a frequency of 1797.420 kilocycles and sharply selective to the 1797.000, 1797.500 and 1797.840 kilocycle carrier waves respectively radiated by the transmitter 21, the transmitter of the unit 12, and the transmitter of the unit 14. The selectivity of this receiver is obviously such that the carrier waves radiated by the transmitter 20, the transmitter of the unit 13 and the transmitter of the unit 11 are rejected in the radio frequency section thereof. The beat frequencies of 340 and 500 cycles between two pairs of carriers; that is, the carriers radiated by the transmitter 21 and the transmitter of the unit 12, forming one pair, and the transmitter of the unit 12 and the transmitter of the unit 14, forming a second pair; accepted by the radio frequency section of the receiver 31 are reproduced in the audio frequency section of this receiver and delivered to the modulator 17 for amplitude modulation upon the output carrier wave of the transmitter embodied in the unit 11 through a narrow band pass filter 32 which is center tuned to frequencies of 340 and 500 cycles. Similarly, the transmitting unit 12 is equipped with a fixed tuned amplitude modulation receiver 33 which is center tuned to a frequency of 1772.110 kilocycles and is sharply selective to the 1772.220, 1772.000 and 1772.150 kilocycle waves respectively radiated by the transmitter 20, the transmitter of the unit 11 and the transmitter of the unit 13. Here again the selectivity of the receiver 33 is obviously such that the carrier waves radiated by the transmitter 21, the transmitter of the unit 12 and the transmitter of the unit 14 are rejected in the radio frequency section of the receiver. The beat frequencies of 150 and 220 cycles between two pairs of carrier waves; i. e., the wave radiated by the transmitter 20 and the transmitter of the unit 11, forming a first pair, and the transmitter of the unit 11 and the transmitter of the unit 13, forming a second pair; accepted by the receiver 33 are reproduced at its output and modulated upon the carrier wave radiated by the transmitter of the unit 12 through a narrow band pass filter 34 which is center tuned to frequencies of 150 and 220 cycles.

To provide coarse position indicating signals for obviating the aforementioned difficulties with respect to ambiguity resolution, means are provided for operating the transmitting units 13 and 14 during the intervals when the transmitting units 20 and 21 are respectively operating. The equipment at the transmitting unit 13 for providing these additional position indicating signals only during alternate one-half cycles of operation comprises a fixed tuned amplitude modulation receiver 35 center tuned to a frequency of 1797.420 kilocycles and sharply selective to the 1797.000, 1797.500 and 1797.840 kilocycle waves respectively radiated by the transmitter 21, the transmitter of the unit 12 and the transmitter of the unit 14. This receiver is sufficiently selective to reject the carrier waves radiated by the transmitter of the unit 11, the transmitter 20 and the transmitter of the unit 13. The output of the receiver 35 developed as a result of heterodyning the three carrier waves accepted by this receiver will be the difference frequencies of the heterodyned signals appearing in the audio section of the receiver as 500, 840 and 340 cycle beat frequencies. The 500 cycle difference frequency signal is passd by the narrow band pass filter 36 which is center tuned to a frequency of 500 cycles and is designed to reject the other audio output signals, in order to actuate the control switch 28 thereby deenergizing the transmitter 27. Similarly the transmitting unit 14 is equipped with a fixed tuned amplitude modulation receiver 37 center tuned to a frequency of 1772.110 kilocycles and sharply selective to the 1772.220, 1772.000 and 1772.150 kilocycle carrier waves respectively radiated by the transmitter 20, the transmitter of the unit 11 and the transmitter of the unit 13. The receiver 37 is sufficiently selective to reject the carrier waves radiated by the transmitter of the unit 21, the transmitter of the unit 12 and the transmitter of the unit 14. The beat frequencies of 150, 220 and 70 cycles between the three carrier waves accepted by the receiver 37 are reproduced in the audio section thereof and applied to the narrow band pass filter 38 center tuned to a frequency of 220 cycles. The filter 38 rejects all of the reproduced audio signals except the 220 cycle beat frequency which is applied to the control switch 30 thereby energizing the switch and deactivating the transmitter 29. The switches 28 and 30 which may be of any suitable type are preferably of the type shown in the above referred to Patent No. 2,629,091 and incorporate a suitable rectifier and control tube and an electromagnetic relay. These switches perform the function of shutting off the transmitters 27 and 29 during alternate one-half cycles of operation thereby insuring that only the transmitter 27 is operative to produce coarse position indicating signals during the interval when the transmitter 20 is operating and that only the transmitter 29 is operative to produce coarse indicating signals when the transmitter 21 is operating.

Referring now particularly to the equipment constituting the mobile receiving unit 15, it is noted that this equipment comprises a fixed-tuned amplitude modulation receiver 39, a second fixed-tuned amplitude modulation receiver 40, four phase angle meters 41, 42, 43 and 44, a pair of narrow band pass filters 45 and 46 center tuned to a frequency of 500 cycles, a pair of narrow band pass filters 47 and 48 center tuned to a frequency of 340 cycles, a pair of narrow band pass filters 49 and 50 center tuned to a frequency of 220 cycles and a pair of narrow band pass filters 51 and 52 center tuned to a frequency 150 cycles. In particular, the receiver 39 is fixed-tuned to a center frequency of 1772.110 kilocycles and is designed to accept the carrier waves radiated by the transmitter 20 and the transmitter of the unit 13 as well as the carrier wave radiated by the transmitter of the unit 11, both when modulated and unmodulated. Similarly, the receiver 40 is fixed-tuned to a center frequency of 1797.420 kilocycles and is designed to accept the carrier waves radiated by the transmitter 21 and the transmitter of the unit 14 and, in addition, the carrier wave radiated by the transmitter of the unit 12, both when modulated and unmodulated. The filters 45 through 52, which may be of any standard commercial construction, perform the functions of selecting the heterodyne or difference frequency signals and the reference signals alternately developed at the output terminals of the receivers 39 and 40 and delivering these signals to the phase meters 41 to 44, inclusive. Preferably these meters are of the general character disclosed in Patent No. 1,762,725 to Marrison, granted June 10, 1930, and are capable of measuring phase angles in excess of 360 electrical degrees between two impressed signal voltages. Each phase meter is equipped with a rotatable rotor carrying a pointer which indexes with a circular scale to indicate the phase relationship between two impressed voltages.

In considering the operation of the above-described position determining system, it will be understood that when the motor and gear train unit 23 is operating to drive the commutating ring 22, anode current is alternately delivered to the electron discharge tubes of the transmitters 20 and 21 whereby these transmitters are alternately rendered operative to radiate carrier waves at frequencies of 1772.220 and 1797.000 kilocycles, respectively. The transmitters of the units 11 and 12, on the other hand, operate continuously and the transmitters of the units 13 and 14 are operated in alternate "on" and "off" cycles to radiate carrier waves of 1772.150 and 1797.840 kilocycles, respectively. Accordingly, during each interval when the transmitter 20 is in operation the carrier waves of 1772.220 and 1772.000 kilocycles respectively radiated by the transmitter 20 and the transmitter of the unit 11 are picked up and heterodyned in the radio frequency sections of the receivers 33, 37 and 39. During this same transmitting interval the transmitter 27 of the transmitting unit 13 is in operation and the 1772.150 kilocycle carrier wave radiated thereby is also received by the receivers 33, 37 and 39. The difference frequency signals of 220 and 150 cycles, respectively, derived at the receiver 33 from heterodyning the carrier waves radiated by the transmitter 20 and the transmitter of the unit 11 and from heterodyning the carrier waves radiated by the transmitter of the unit 11 and the transmitter of the unit 13, are passed by the filter 34 and modulated upon the carrier wave output of the transmitter of the unit 12. It will be understood that the beat frequency signal of 70 cycles between the carrier waves radiated by the transmitter 20 and the transmitter of the unit 13 which is also developed in the receiver 33 is rejected by the band pass filter 34. The carrier wave output of the transmitting unit 12 modulated by the two 150 and 220 cycle reference signals is received by the receiver 40 of the mobile receiving unit 15 and the modulation components are reproduced at the output terminals of this receiver. The 220 cycle reference signal reproduced by the receiver 40 is applied through the band pass filter 50 to the right set of input terminals of the phase meter 43, the band pass filters 46, 48 and 52 functioning to prevent the application of this modulation component to any of the other phase meters. The 150 cycle reference signal reproduced by the receiver 40 is applied through the band pass filter 52 to the right hand set of input terminals of the phase meter 44, the filters 46, 48 and 50 preventing the application of this modulation component to any of the other phase meters.

During the period indicated the receiver 37 receives the carrier waves radiated by the transmitter 20, the transmitter of the unit 11 and the transmitter of the unit 13. The 220 cycle beat frequency between the carrier waves radiated by the transmitter 20 and the transmitter of the unit 11 is produced at the output terminals of the receiver and is passed by the filter 38, which functions to reject the other heat frequency signals produced at the output of the receiver 37. The passage of the 220 cycle beat frequency signal through the filter 38 energizes the switch 30 and renders the transmitter 29 inoperative so long as the 220 cycle signal is applied to the control switch 30. Therefore, during the first interval of operation the transmitter 29 and the transmitter 21 are both inoperative and the receiver 40 develops no heterodyne or beat frequency signals and receiver 31 develops no heterodyne or beat frequency signals.

The receiver 39, however, is excited by the carrier waves radiated by the transmitter 20, the transmitter of the unit 11 and the transmitter of the unit 13, all of which are operative during the first transmitting interval. The 220 cycle beat frequency or heterodyne signal resulting from heterodyning the carrier waves radiated by the transmitter 20 and the transmitter of the unit 11 is reproduced at the output terminals of the receiver 39 and is applied through the band pass filter 49 to the left hand set of input terminals of the phase meter 43, the filters 45, 47 and 51 functioning to reject this beat frequency signal. Thus two signal voltages of a frequency of 220 cycles are applied to the two sets of input terminals of the phase meter 43 with the result that this phase meter functions to measure the phase angle therebetween. This phase angle indication is accurately representative of the position of the mobile receiving unit 15 between two equiphase lines of the standing waves produced in space as a result of the carrier wave radiation by the transmitter 20 and the transmitter of the unit 11.

The beat frequency of 150 cycles resulting from heterodyning the carrier waves radiated by the transmitter of the unit 11 and the transmitter of the unit 13, is also reproduced across the output terminals of the receiver 39 and is applied through the filter 51 to the left-hand set of input terminals of the phase meter 44, the filters 45, 47 and 49 serving to reject this beat frequency signal. The phase meter 44 is thus energized at its opposite sets of input terminals by two signal voltages of a frequency of 150 cycles, and, therefore, this phase meter registers the phase angle between the two voltages. This phase angle indication is representative of the position of the receiving unit 15 between two equiphase lines of standing waves produced in space as a result of the carrier wave radiation by the transmitter of the unit 11 and the transmitter of the unit 13. Since the transmitter 21 and the transmitter of the unit 14 are both inoperative during the first transmitting interval, the receiver 35 in the transmitting unit 13 develops no heterodyne or beat frequency signals and the modulation components from the transmitting unit 12 are rejected by filter 36 with the result that no signal voltage is applied to the switch 28. Therefore during the entire period of operation of the transmitter 20 the switch 28 remains in a deenergized condition and the transmitter 27 functions to radiate position indicating carrier waves.

At the end of the described transmitting interval the commutating ring 22 functions to interrupt the circuit delivering anode current to the tubes of the transmitter 20 with the result that carrier wave radiation from this transmitter is terminated. The cessation of carrier wave radiation from this transmitter arrests the carrier heterodyne action occurring at the receivers 33, 37 and 39 thereby interrupting the reference signal radiation by the transmitter of the unit 12 preventing the development of heterodyne or difference frequency signals across the output terminals of receiver 37, and rendering the receiver 39 ineffective to develop heterodyne or difference frequency signals at its output. Since the phase meters 43 and 44 no longer receive the beat frequency signals from the output of the receiver 39, these meters are prohibited from further changing the setting of their respective indicating elements. The interruption of the heterodyne signals developed at the output of the receiver 37 halts the delivery of actuating signals to the switch 30, thereby deenergizing this switch and rendering the transmitter 29 effective to radiate position indicating carrier wave signals.

A short time interval after the operation of the transmitter 20 is stopped, the commutating ring 22 functions to deliver anode current to the tubes of the transmitter 21 and thus initiate operation of this transmitter. With the transmitter 21 in operation a 1797.000 kilocycle position indicating carrier wave is radiated thereby which is accepted by the receivers 31, 35 and 40. The receiver 35 functions to heterodyne the carrier wave radiated by the transmitter 21 with the carrier wave radiated by the transmitter of the unit 12 and to reproduce the heterodyne or difference frequency signal of 500 cycles at its output terminals. This receiver is also responsive to the carrier wave radiated by the transmitter of the unit 14, but the difference frequency signals of 840 cycles between the latter transmitter and the transmitter 21 and of 340 cycles between the transmitter of the unit 12 and the transmitter of the unit 14 are rejected by the band pass filter 36, whereas the 500 cycle heterodyne signal is passed by this filter to activate the switch 28 and immediately terminate the generation of carrier waves by the transmitter 27. Simultaneously therewith the receiver 31 functions to heterodyne the carrier wave radiated by the transmitter 21 with the carrier wave radiated by the transmitter of the unit 12 and also functions to heterodyne the carrier wave radiated by the transmitter of the unit 12 with the carrier wave radiated by the transmitter of the unit 14. The two beat frequency or difference signals of 340 and 500 cycles developed at the output terminals of the receiver 31, are passed by the filter 32 to the modulator 17 for amplitude modulation upon the output carrier wave of the transmitter of the unit 11 to be radiated as a reference signal to the receiver 39. The filter 32 functions to reject the 840 cycle beat frequency signal developed by the receiver 31 as a result of heterodyning the carrier waves radiated by the transmitter 21 and the transmitter of the unit 14. The receiver 39 accepts the modulated carrier wave radiated by the transmitter of the unit 11 and reproduces the two modulation components thereof in the usual manner. The reference signal of 500 cycles thus developed across the output terminals of the receiver 39 is applied through the band pass filter 45 to the left hand set of input terminals of the phase meter 41, the filters 47, 49 and 51 functioning to prevent the application of this reference signal to the phase meters 42, 43 and 44, respectively. The 340 cycle reference signal developed at the output terminals of the receiver 39 is applied through the filter 47 to the left hand set of input terminals of the phase meter 42, the filters 45, 49 and 51 serving to reject this reference signal. Since the transmitter 20 and the transmitter of the unit 13 are both inoperative during the second transmitting interval, it will be understood that the receiver 39 will not develop any heterodyne or difference frequency signals at its output terminals during this period.

The 1797.000, 1797.500 and 1797.840 kilocycle waves respectively radiated by the transmitter 21, the transmitter of the unit 12 and the transmitter of the unit 14 are all accepted by the receiver 40 and heterodyned in the radio frequency section thereof to produce heterodyne or difference frequency signals which are produced across the output terminals of the receiver. The 840 cycle beat frequency signal between the carrier waves radiated by the transmitter 21 and the transmitter of the unit 14 which appears at the output terminals of the receiver 40 is rejected by the filters 46, 48, 50 and 52 and therefore is not applied to any of the phase meters at the mobile receiving unit 15. However, the 500 kilocycle heterodyne signal produced at the output of the receiver 40 as a result of heterodyning, the carrier waves radiated by the transmitter 21 and the transmitter of the unit 12 is applied through the band pass filter 46 to the right hand set of input terminals of the phase meter 41. Thus reference and heterodyne or difference frequency signals of identical frequencies are respectively applied to the two sets of input terminals of the phase meter 41 and, this phase meter functions to measure the phase relationship between the two applied signal voltages thereby providing an indication accurately representative of the position of the receiving unit 15 between two equiphase lines of the standing waves produced in space by the radiation of position indicating carrier waves from the transmitter 21 and the transmitter of the unit 12. The 340 cycle beat frequency or heterodyne signal developed at the output of the receiver 40 is applied through the band pass filter 48 to the right hand set of input terminals of the phase meter 42, the filters 46, 50 and 52 functioning to prevent the application of this heterodyne signal to the other phase meters. Therefore, during the second transmitting interval no signal voltages are applied to the phase meters 43 and 44 and these meters remain inoperative during the interval when the transmitter 21 is in operation. The phase meter 42 however has applied to its two sets of input terminals a reference signal and a heterodyne or beat frequency signal of identical frequency. The phase meter 42 thus functions to measure the phase relationship between the applied signals thereby providing an indication representative of the position of the mobile receiving unit between two equiphase lines of the standing waves produced in space by the radiation of position indicating carrier waves from the transmitter of the unit 12 and the transmitter of the unit 14.

At the end of the described transmitting interval the commutating ring 22 functions to interrupt anode current flow to the tubes of the transmitter 21 and thus arrests operation of this transmitter. When the carrier wave radiation by the transmitter 21 is thus terminated, the wave heterodyne action effected in the receivers 31, 35 and 40 is instantly stopped to terminate the radiation of 500 and 340 cycle reference signals by the transmitter of the unit 11, and to terminate reproduction of the difference or heterodyne signals at the output terminals of the receiver 40. The application of signal voltages to the input terminals of the phase meters 41 and 42 thereupon ceases with the result that no further change of the setting of the indicating elements of these meters can be produced. Simultaneously therewith the development of heterodyne signals at the output of the receiver 35 is interrupted and the switch 28 is therefore deenergized to reinitiate operation of the transmitter 27. A short time interval after operation of the transmitter 21 is arrested, the commutating ring 22 functions to recomplete the circuit for delivering anode current to the tubes of the transmitter 20 thereby reinitiating operation of this transmitter with the results indicated above.

From the foregoing explanation it will be understood that the transmitters 20 and 21 in their alternate operation to radiate position indicating carrier waves cooperate with the receivers 31 and 33 of the transmitting units 11 and 12 alternately to render the transmitters of these units operative to radiate position indicating signals and reference signals. More particularly, the position indicating carrier waves alternately radiated by the transmitters 20 and 21 alternately cause the position indicating carrier waves respectively radiated by the transmitters of the units 11 and 12 to be modulated with reference signals during periods when these transmitters are respectively inactive as position indicating signal radiators. It will also be understood that the transmitters 20 and 21 cooperate with the receivers 35 and 37 of the transmitting units 13 and 14 intermittently to render the transmitters of these units operative to radiate position indicating signals. Specifically, the position indicating carrier waves alternately radiated by the transmitters 20 and 21 alternately effect the cessation of radiations by the transmitters of the units 14 and 13, respectively, so that the transmitter of the unit 13 is operative as a position indicating signal radiator when the transmitter 20 is in operation and the transmitter of the unit 14 is operative as a position indicating signal radiator during the period when the transmitter 21 is in operation.

From a consideration of the solid line and dashed line arrows of Fig. 1 and reflection upon the above explanation, it will be understood that the receivers 39 and 40 alternately function as reference signal detecting receivers and as heterodyning receivers for developing the required heterodyne or difference frequency signals. Specifically, the receiver 39 functions as a heterodyne receiver with respect to the position indicating carrier waves radiated by the transmitter 20, the transmitter of the unit 11 and the transmitter of the unit 13, and functions as a reference signal reproducing receiver in receiving the reference signal modulated carrier wave radiated by the transmitter of the unit 11. The receiver 40, on the other hand, functions as a heterodyne receiver with respect to the position indicating carrier waves radiated by the transmitter 21, the transmitter of the unit 12 and the transmitter of the unit 14 and as a reference signal detecting receiver in receiving the reference signal modulated carrier wave radiated by tthe transmitter of the unit 12.

As will be evident from the above explanation, the phase meter 41 functions to produce a phase angle indication which is representative of the position of the receiving unit 15 between two equiphase lines of the standing waves produced in space as a result of carrier wave radiation by the transmitter 21 and the transmitter of the unit 12. With the described arrangement wherein carrier wave frequencies of 1797.000 and 1797.500 kilocycles are employed, the wave length spacing between the equiphase lines along a line bisecting the units 10 and 12 is determined by the mean frequency of 1797.250 kilocycles between the two radiated carrier waves. At this particular mean frequency equiphase lines representative of the same phase relationship between the standing waves produced by the transmitter 21 and the transmitter of the unit 12 along the line joining the unit 10 and the unit 12 are spaced apart a distance of about 275 feet. Hence, the indication provided by the phase meter 41 identifies the position of the receiving unit 15 within a zone not less than 275 feet in width, i. e., a zone having a minimum width equal to one-half the wave length of a wave having a frequency equal to the mean frequency of the position indicating carrier waves radiated by the transmitter 21 and the transmitter of the unit 12.

As previously indicated, the indication provided by the phase meter 41 standing alone is ambiguous for the reason that this indication does not identify the point of location of the receiving unit 15 along the zone separating the two adjacent equiphase lines of the standing waves produced in space by the transmitter 21 and the transmitter of the unit 12. Identification of this point is obtained through the response of the receiving unit to the position indicating signals radiated by the transmitter 20 and the transmitter of the unit 11. Thus the phase meter 43 provides an indication of the position of the mobile receiving unit 15 between two equiphase lines of the standing waves produced in space by the radiation of position indicating carrier waves from the transmitter 20 and the transmitter of the unit 11. Here again, the wave length spacing of equiphase lines along a line bisecting the two units 10 and 11 is determined by the mean frequency of 1772.110 kilocycles, between the frequencies of the waves radiated by the transmitter 20 and the transmitter of the unit 11. At this particular mean frequency equiphase lines representative of the same phase relationship between the standing waves produced by the two identified transmitters have a minimum spacing of approximately 278 feet, whereby the indication provided by the meter 43 identifies the position of the receiving unit 15 within a zone having a 278 foot minimum width. The two indications provided by the phase meters 41 and 43 may readily be converted to position data by consulting a hyperbolic chart showing the hyperbolic equiphase lines in their geographic relationship to the known radiation points of the transmitting units 10, 11 and 12.

As previously indicated herein, although the position indications provided by the two phase meters 41 and 43 identify the position of the receiving unit 15 relative to adjacent isophase lines with extreme accuracy, they are ambiguous in the sense that they do not identify the particular lanes between these lines in which the signals are collected at the receiving unit 15. Hence, until the starting point of the unit 15 is known and the lanes are counted as the station is moved about within the area of signal radiation from the three transmitting units 10, 11 and 12, the indications provided by the two phase meters cannot be interpreted to identify the position of the receiving unit 15. The use of integrating counters to register the number of lanes traversed by the mobile receiving unit 15 as it moves within the area of radiation of the transmitters does not afford a complete solution to the ambiguity problem inasmuch as a lane count is frequently lost without the operator's knowledge due to such conditions as transmitter failure, interference or the like. As soon as these conditions are remedied, the indicators of the phase meters 41 and 43 return to their correct phase indicating position so as to identify the fractional part of a lane within which the mobile receiving unit is positioned but the lane counters incorrectly register the particular lane in which the receiving unit is located. In accordance with the present invention, lane identification is provided by measuring the difference in phase of the two pairs of signals received at the mobile receiving unit from the fixed transmitting units 11 and 13 and 12 and 14 respectively, the transmitting units 13 and 14 being spaced relatively close to the transmitting units 11 and 12, respectively. As indicated above, the phase meter 42 provides an indication which is representative of the position of the mobile receiving unit 15 between two equiphase lines of the standing waves produced in space as a result of carrier wave radiation by the transmitter of the unit 12 and the transmitter of the unit 14. These isophase lines are spaced apart in a base-line joining the units 12 and 14 by a distance corresponding to one-half wave length of a wave having a frequency equal to the mean frequency of the carrier waves radiated by the two units. However, when the units are spaced close together, the hyperbolas, which are representative of the isophase lines and have foci at the units 12 and 14, expand very rapidly as they depart from the base line joining these two units.

Referring now to Fig. 2 there is shown a position determining system in which the unit 14 is spaced from the unit 12 a distance of less than one-half wave length so that there is a maximum of one lane between the two units. The phase indications produced on the phase meter 42 as a result of carrier wave radiation from these units, therefore, have a maximum variation of 360° when the mobile receiving unit 15 passes from one transmitter to the other irrespective of the path of travel selected. The phase meter 42, consequently, indicates in degrees the relative position of the receiving unit with respect to a single pair of isophase lines produced by the carrier waves radiated by the units 12 and 14 thus eliminating any ambiguity as to which pair of isophase lines is involved. Due to the rapid divergence of the hyperbolic lines representative of constant phase difference in the areas on either side of the base line interconnecting the units, a large increment of distance traversed by the receiving unit is represented by each degree of indicator reading on the phase meter 42 when the receiver is moving in an area on either side of the base line interconnecting the units 12 and 14. The accuracy with which the meter 42 may be read limits the accuracy of the position determination derived from the indication on this phase meter. Thus in Fig. 2, the phase angle measurement appearing on the phase meter 42 may be in error by an amount which is represented by the distance between the dashed lines 63, the error obviously becoming greater as the receiving unit is moved farther from the base line interconnecting the units 12 and 14. The indication on the meter nevertheless approximates the hyperbolic line along which the receiver is positioned and, therefore, provides a coarse position indication which is ambiguous only in the sense that it does not identify the point of location along the particular hyperbolic line indicated by the phase meter 42. To provide the latter identification, the transmitting unit 13, as shown in Fig. 2, is spaced from the transmitting unit 11 at a distance less than one-half wave length of the mean frequency between the carrier waves radiated by the units 11 and 13. The phase meter 44 then functions to provide an indication of the position of the mobile receiving unit 15 between a single pair of isophase lines produced as a result of the carrier wave radiation from the units 11 and 13. Again it will be noted that there is a maximum variation of 360° on the phase meter 44 as the mobile receiving unit 15 travels from the unit 11 to the unit 13 and, therefore, there can be no ambiguity as to which pair of isophase lines is involved. The rapid expansion of the hyperbolic lines on either side of the base line interconnecting the units 11 and 13 provides a large increment of distance variation for each degree of indicator setting on the phase meter 44 when the receiving unit is moved in an area located on either side of the base line interconnecting the units 11 and 13. Since the indications on the phase meter 44 can only be ascertained with limited accuracy, the dashed lines 62 represent the possible error in phase meter reading on this meter. Obviously this error increases in proportion to the distance between the mobile receiving unit 15 and the base line interconnecting the units 11 and 13. The intersections of the dashed lines 62 and 63 define an area within which the mobile receiving unit 15 is positioned, the boundaries of this area being determined by the accuracy of the indication on the phase meters 42 and 44. This area is small enough to include only one fine lane as represented by the indications on the phase meters 41 and 43, and, therefore, the operator of the receiving equipment may ascertain from the readings on the meters 42 and 44 the particular lane on a hyperbolic chart in which the receiving unit is located and the proper count which should appear on the revolution counters for the phase meters 41 and 43. Thus it can be seen that the indications on the meters 42 and 44 define a coarse range within which the mobile receiving unit is located, as indicated by the dashed lines 62 and 63, and the fine phase measurements appearing on the phase meters 41 and 43 accurately establish the position of the mobile receiving unit within this coarse range.

The hyperbolic isophase lines established as a result of the standing waves produced in space by carrier wave radiation from the widely spaced units 10 and 11 are designated by the reference character 60 in Fig. 2. Two adjacent hyperbolic lines define a fine lane and the position of the mobile receiving unit between two such hyperbolas is portrayed on the phase meter 43. Similarly, the isophase lines produced in space by the standing waves resulting from carrier wave radiation by the widely spaced transmitting units 10 and 12 are designated by the reference character 61. Each adjacent pair of these isophase hyperbolic lines also defines a fine lane and the position of the mobile receiving unit 15 between two such lines is displayed on the fine position indicating meter 41.

As the mobile receiving unit 15 moves farther from the transmitting units 11, 12, 13 and 14, the area defined by the dashed lines 62 and 63 becomes considerably larger and eventually may become sufficiently large to encompass more than one of the fine lanes produced as a result of carrier wave radiation from the widely spaced transmitting units 10 and 11 and 10 and 12. To prevent the area of error as defined by these dashed lines from becoming excessively large, the units 13 and 14 may be spaced from the units 11 and 12, respectively, by a distance which, while it exceeds one-half wave length, is substantially less than the respective spacings between the transmitting units 10 and 11 and 10 and 12 as shown in Fig. 3. As the mobile receiving unit 15 moves from the unit 11 to the unit 13 the phase meter 44 undergoes a change of indication which is greater than 360°. The spacing between the equiphase lines along the base lines interconnecting the units 11 and 13 and the units 12 and 14 resulting from carrier wave radiation by the transmitters of these units will remain unchanged inasmuch as this spacing is determined by the mean frequency of the carrier waves radiated by the pairs of transmitters. However, the divergence of the hyperbolic isophase lines is less than the divergence of the hyperbolas produced when the units 13 and 14 are spaced as shown in Fig. 2 at a distance less than one-half wave length from the transmitting units 11 and 12, respectively. The decreased divergence of the hyperbolic lines when the spacing between the end transmitters is increased results in a decrease of the increment of distance represented by each degree of indicator setting on the phase meters 42 and 44 when the mobile receiving unit is moved within areas on either side of the base lines interconnecting these end transmitters. In this manner, the possible error in measurement is reduced since the phase meter indications may be ascertained with the same accuracy as above and the reading error represents less actual distance error. The spacing between the lines 62' in Fig. 3 which represents the error as a result of the indications on the phase meter 44 is less than the spacing between the lines 62 of Fig. 2 described above. In the same manner each degree of indicator reading on the phase meter 42 is representative of a reduced error distance and the range of error represented by the distance between the lines 63' in Fig. 3 is less than that between the lines 63 of Fig. 2. The area defined by the dashed lines 62' and 63' which is representative of the possible error of phase meter readings on the meters 42 and 44 is, therefore, reduced by increasing the spacing between the transmitting units 11 and 13 and between the units 12 and 14. Obviously, the units 13 and 14 may be positioned at any desired distance from the units 11 and 12, which distance may be either less than or greater than one half wave length of the main frequencies of the carrier waves radiated by the units. By positioning the transmitters 13 and 14 at optimum distances to maintain the area of error between the lines 62' and 63' less than one of the fine lines as indicated on the phase meters 41 and 43, the phase meters 42 and 44 indicate an approximate area within which the receiving unit is located. By referring to a hyperbolic chart of the survey area the coarse indications appearing on the phase meters 42 and 44 may be employed to ascertain the correct setting on the revolution counters registering the lanes. If the area of error is maintained less than one of the fine lanes produced by the widely spaced transmitting units 10 and 11 and 10 and 12, there is no ambiguity with the area of error. Manifestly, when the spacing between the end transmitters exceeds one half wave length the same readings will be obtained on the phase meters 42 and 44 at different positions within the survey area, and, therefore, some ambiguity exists. However, these readings generally occur at widely spaced positions of the mobile receiving equipment and a continuous check on the lane counters obviates any difficulty in ascertaining the particular position which is being recorded. If the operator knows the approximate location of the mobile receiving unit he may determine which of the hyperbolic lines represented by the indications on the phase meters 42 and 44 portrays the position of the receiving unit.

From the foregoing explanation it will be apparent that the present invention affords a satisfactory solution to the problem of minimizing the number of radio frequency channels required to form a completely non-ambiguous radio position determining system. Not only does the described system satisfactorily obviate the problem of minimizing channel requirements, but in addition it minimizes the amount of equipment required to form a complete system. Moreover, this equipment may be comprised of standard and well-known components throughout and may be operated with facility by a semi-skilled operator. The system is characterized by the precision accuracy inherent in phase comparison systems of position determination and incorporates therein the desirable feature of non-ambiguity.

While particular embodiments of the invention have been shown, it will be understood, of course, that the invention is not limited thereto since many modifications may be made, and it is therefore contemplated by the appended claims to cover any such modifications as fall within the true spirit and scope of the invention.

What is claimed as new and desired to be secured by Letters Patent of the United States is:

1. In a position determining system having a receiving point, a first pair of spaced transmitters for radiating position indicating signals, means for alternately modulating the signals radiated by said first pair of transmitters with reference signals, a second pair of transmitters associated with said first pair of transmitters for radiating additional position indicating signals, means for alternately rendering each transmitter of said second pair operative to radiate said additional position indicating signals, and receiving and translating apparatus at said receiving point jointly responsive to all of said position indicating signals and to said reference signal for producing a plurality of indications respectively representative of the position of said receiving point relative to different ones of said transmitters.

2. In a position determining system having a receiving point, a first pair of spaced transmitters, a transmitting unit spaced at relatively large distances from each of said transmitters and including means for intermittently radiating at least one position indicating signal, means at least in part responsive to said signal for rendering at least one of said first pair of transmitters alternately operative to transmit position indicating and reference signals, a second pair of transmitters for radiating signals and positioned so that each transmitter of said second pair is located relatively close to one of the transmitters of said first pair, means for alternately rendering each of the transmitters of said second pair operative to radiate said additional position indicating signals, and receiving and translating apparatus at said receiving point jointly responsive to all of said position indicating signals and to said reference signals for producing a plurality of indications respectively representative of the position of said receiving point relative to different ones of said transmitters.

3. In a position determining system having a receiving point a first pair of spaced transmitters continuously operative to radiate distinguishable position indicating signals, additional transmitting apparatus spaced at relatively large distances from each of said first pair of transmitters and including means for radiating at least one other position indicating signal, a second pair of transmitters for radiating additional position indicating signals and positioned so that each transmitter of said second pair is located relatively close to one of the transmitters of said first pair, means at least in part responsive to said additional position indicating signals for intermittently modulating the signal radiated by at least one of said first pair of transmitters with a reference signal, and receiving and translating apparatus at said receiving point jointly responsive to all of said position indicating signals and to said reference signals for producing a plurality of indications respectively representative of the position of said receiving point relative to different ones of said transmitters.

4. In a position determining system having a receiving point, a first pair of spaced transmitters continuously operative to radiate distinguishable position indicating signals, additional transmitting apparatus spaced from each of said first pair of transmitters and including means for alternately radiating two other distinguishable position indicating signals, a second pair of transmitters associated with said first pair of transmitters for radiating additional position indicating signals, heterodyning receivers respectively associated with each of said first pair of transmitters and each jointly responsive to the position indicating signal radiated by the other transmitter of said first pair, to a different one of the transmitters of said second pair and to a different one of the signals radiated by said additional transmitting apparatus for alternately modulating the signals radiated by each of said first pair of transmitters with a plurality of reference signals, and receiving and translating apparatus at said receiving point jointly responsive to all of said position indicating signals and to said reference signals for producing a plurality of indications respectively representative of the position of said receiving point relative to different ones of said transmitters.

5. In a position determining system having a receiving point, a first pair of spaced transmitters continuously operative to radiate distinguishable position indicating signals, additional transmitting apparatus spaced from each of said transmitters and including means for alternately radiating two other distinguishable position indicating signals, a second pair of transmitters associated with said first pair of transmitters for radiating additional position indicating signals, heterodyning receivers respectively associated with each of said first pair of transmitters and each jointly responsive to the position indicating signal radiated by the other transmitter of said first pair, to a different one of the position indicating signals radiated by a transmitter of the second pair and to a different one of the signals radiated by said additional transmitting apparatus for alternately modulating the signals radiated by each of said first pair of transmitters with reference signals having frequencies respectively equalling the difference frequencies of the heterodyned signals, other heterodyne receivers respectively associated with each of said second pair of transmitters and each jointly responsive to a different one of the position indicating signals radiated by one of the transmitters of the first pair and to a different one of the signals radiated by said additional transmitting apparatus for alternately rendering the transmitters of said second pair inoperative, and receiving and translating apparatus at said receiving point jointly responsive to all of said position indicating signals and to said reference signals for producing a plurality of indications respectively representative of the position of said receiving point relative to different ones of said transmitters.

6. A position determining system comprising a first pair of spaced transmitters for radiating waves of different frequencies to a receiving point, additional transmitting apparatus spaced at relatively large distances from said first pair of transmitters, and including means for alternately radiating to said receiving point two other waves at still different frequencies, a second pair of transmitters associated with said first pair of transmitters for radiating waves of even different frequencies and positioned so that each transmitter of said second pair is located relatively close to one of the transmitters of said first pair, means responsive in part to the waves radiated by said additional transmitting apparatus and in part to the waves radiated by said second pair of transmitters for alternately modulating the waves radiated by said first pair of transmitters with reference signals, and receiving and translating apparatus at said receiving point jointly responsive to all of said position indicating signals and to said reference signals for producing a plurality of indications respectively representative of the position of said receiving point relative to different ones of said transmitters.

7. A position determining system comprising a first pair of spaced transmitters for radiating waves of different frequencies to a receiving point, a transmitting unit spaced from said transmitters and including means for alternately radiating to said receiving point two other waves at still different frequencies, a second pair of spaced transmitters for radiating waves of even different frequencies to said receiving point, one of the waves radiated by said transmitting unit differing from the wave radiated by one of the said first pair of transmitters by a first predetermined difference frequency and the other of the waves radiated by said transmitting unit differing from the wave radiated by the second transmitter of said first pair by a second predetermined difference frequency, the wave radiated by the first transmitter of said first pair differing from the wave radiated by one of the transmitters of said second pair by a third predetermined difference frequency and the wave radiated by the transmitting unit of the first pair differing from the wave radiated by the second transmitter of said second pair of transmitters by a fourth predetermined difference frequency, means responsive to the waves radiated by said transmitting unit for alternately modulating the wave radiated by the first transmitter of said first pair with reference signals having frequencies related to said second and fourth predetermined difference frequencies and for modulating the wave radiated by the second transmitter of the first pair with reference signals having frequencies related to said first and third difference frequencies, and receiving and translating apparatus at said receiving point jointly responsive to all of said position indicating signals and to said reference signals for producing a plurality of indications respectively representative of the position of said receiving point relative to different ones of said transmitters.

8. A wave signal transmission system for radiating position indicating signals comprising a first pair of spaced transmitters for radiating waves at different frequencies, a second pair of transmitters for radiating waves at still different frequencies, a third pair of spaced transmitters for radiating waves at even different frequencies, means for alternately rendering said second pair of transmitters operative, means responsive to the waves radiated by said second pair of transmitters for alternately rendering said third pair of transmitters inoperative, and means in part responsive to the waves radiated by said second and third pair of transmitters for alternately modulating the waves radiated by said first pair of transmitters with reference signals.

9. A wave signal transmission system for radiating position indicating signals comprising a first pair of spaced transmitters for radiating waves at different frequencies, a second pair of transmitters for radiating waves at still different frequencies, a third pair of spaced transmitters for radiating waves at even different frequencies, means for alternately rendering operative one transmitter of each of said second and third pairs, and means responsive to the waves radiated by the operative transmitters of said second and third pairs for alternately modulating the waves radiated by the transmitters of said first pair with reference signals.

10. In a position indicating system of the type requiring the transmission of signals from both position indicating transmitters which radiate position indicating signals and link transmitters which radiate reference signals, a first pair of spaced transmitters for radiating position indicating signals, additional transmitting apparatus spaced from each of said transmitters for radiating at least one other position indicating signal, a second pair of spaced transmitters for radiating additional position indicating signals, means responsive to operation of said additional transmitting apparatus for alternately converting said first pair of transmitters into link transmitters, and means for rendering a different one of the transmitters of said second pair inoperative during alternate intervals when one of the transmitters of said first pair is operating as a link transmitter.

11. In a position indicating system of the type requiring the transmission of signals from both position indicating transmitters which radiate position indicating signals and link transmitters which radiate reference signals, a first pair of spaced transmitters for radiating position indicating signals, additional transmitting apparatus spaced from each of said transmitters and including means for alternately radiating two other position indicating signals, a second pair of spaced transmitting units positioned at relatively large distances from said additional transmitting apparatus, each transmitting unit of said second pair being located relatively close to one of the transmitters of said first pair and each including means for intermittently radiating two additional position indicating signals, and means selectively responsive to different ones of said other position indicating signals and said additional position indicating signals for alternately converting the transmitters of said first pair into link transmitters.

12. A wave signal transmission system for radiating position indicating waves comprising a first pair of spaced transmitters for radiating waves at different frequencies, a transmitting unit spaced from each transmitter of said first pair and including means for alternately radiating waves at two still different frequencies, a second pair of transmitters spaced at relatively large distances from said transmitting unit, each transmitter of said second pair being located relatively close to one of the transmitters of the first pair and each including means for intermittently radiating waves at even different frequencies, and means responsive to the waves radiated by said transmitting unit and said second pair of transmitters for alternately modulating the waves radiated by each transmitter of said first pair of transmitters with reference signals.

13. A wave signal transmission system comprising five spaced transmitting units for radiating two groups of waves, all of said waves having different frequencies, one of said units including means for alternately radiating one wave of each group, means responsive to the waves radiated by said one unit for alternately rendering a second and third of the units inoperative, and means responsive to the waves radiated by said one unit for alternately modulating the waves radiated by a fourth and fifth of the other units with a plurality of reference signals having frequencies related to the difference frequencies between the individual waves of said two groups.

14. A wave signal transmission system comprising five spaced transmitting units for radiating two groups of waves, all of said waves having different frequencies, one of said units including means for alternately radiating one wave of each group, means respectively associated with two others of said units and selectively responsive to one of the waves radiated by said one unit for intermittently rendering each of said two other units inoperative, and means associated with a fourth and fifth of said units and selectively responsive to one of the waves radiated by said one unit and to the wave radiated by the operating one of said two other units for alternately modulating the waves radiated by said fourth and fifth units with reference signals having frequencies related to the difference frequencies between the frequency of said one wave and the frequency of the wave radiated by the other of the fourth and fifth units, and between the wave radiated by the operative one of said other two units and the frequency of the wave radiated by the other of the fourth and fifth units.

15. A wave signal transmission system comprising five spaced transmitting units for radiating two groups of waves, all of said waves having different frequencies, one of said units including means for alternately radiating one wave of each group, means respectively associated with each of the first and second of the other four units and selectively responsive to one and then the other of the waves radiated by said one unit for alternately rendering said first and second units inoperative, and means respectively associated with each of the third and fourth of the other four units and selectively responsive to one and then the other of the waves radiated by said one unit and responsive to the wave radiated by the operative one of said first and second units for alternately modulating the wave radiated by said third unit with reference signals having frequencies related to the difference frequency between the frequency of said one wave and the wave radiated by said fourth unit and to the difference frequency between the frequency of the wave radiated by said fourth unit and the wave radiated by said second unit and for alternately modulating the wave radiated by said fourth unit with other reference signals having frequencies related to the difference frequency between the frequency of said other wave and the frequency of the wave radiated by said third unit and to the difference frequency between the frequency of the wave radiated by said third unit and the frequency of the wave radiated by said first unit.

16. A wave signal transmission system comprising five spaced transmitting units for radiating two groups of waves, all of said waves having different frequencies, one of said units including means for alternately radiating one wave of each pair, means associated with a first of the other four units and selectively responsive only to one of the waves radiated by said one unit for intermittently rendering said first unit inoperative, means associated with a second of the other four units and selectively responsive to the other of the waves radiated by said one unit for intermittently rendering said second unit inoperative, receiving means associated with a third of the other four units and selectively responsive to said one wave radiated by said one unit for heterodyning said one wave with the wave radiated by a fourth of said other four units, for heterodyning the wave radiated by said second unit with the wave radiated by said four unit and for modulating the difference frequency signals upon the wave radiated by said third unit, and receiving means associated with said fourth unit and responsive to the other of the waves radiated by said one unit for heterodyning said other wave with the wave radiated by said third unit, for heterodyning the wave radiated by said third unit with the wave radiated by the second of said other units and for modulating the difference frequency signals upon the wave radiated by said fourth unit.

17. A wave signal transmission system comprising five spaced transmitting units for radiating two groups of waves, all of said waves having different frequencies, one of said units including means for alternately radiating one wave of each group, receiving means associated with a first of the other four units and selectively responsive only to one of the waves radiated by said one unit for heterodyning said one wave with the wave radiated by a second of the other four units and for reproducing the difference frequency signal, switching means responsive to said difference frequency signal for alternately rendering said first unit inoperative, receiving means associated with a third of said units and responsive only to the other of the waves radiated by said one unit for heterodyning said other wave with the wave radiated by the fourth of said other units and for reproducing the difference frequency signal, switching means responsive to said last named difference frequency signal for alternately rendering said third unit inoperative, means including receiving means for modulating the waves radiated by said fourth unit during the periods when said first unit is rendered inoperative, and means including receiving means for modulating the waves radiated by said second unit during the periods when said third unit is rendered inoperative.

18. A wave signal transmission system comprising a first transmitter for radiating a position indicating signal, a second transmitter for radiating a second signal during spaced intervals, a third transmitter for radiating other position indicating signals, modulating means responsive to said second signal for modulating the signal radiated by said first transmitter with a reference signal during said spaced intervals, and means controlled by said second signal for rendering said third transmitter inoperative during the intervals when said first transmitter is being modulated.

19. A wave signal transmission system comprising six spaced transmitters for radiating signals at different frequencies, means for intermittently rendering one of said transmitters operative to radiate a signal, switching means jointly responsive to the signals radiated by said one transmitter and by a second of said transmitters for rendering a third transmitter inoperative during each interval when said one transmitter is operating, means for intermittently rendering a fourth of said transmitters operative to radiate a signal between the intervals when said one transmitter is operative, switching means jointly responsive to the signals radiated by said fourth transmitter and by a fifth of said transmitters for rendering a sixth transmitter inoperative during each interval when said fourth transmitter is operating, means for modulating the signals radiated by said second transmitter during the intervals when said fourth transmitter is operative, and means for modulating the signals radiated by said fifth transmitter during the intervals when said one transmitter is operating.

20. In a position indicating system of the type requiring the transmission of signals from both position indicating transmitters for radiating position indicating signals and link transmitters which radiate reference signals, a first pair of spaced transmitters for radiating position indicating signals, a second pair of spaced transmitters for radiating additional position indicating signals, means for alternately modulating the signals radiated by said first pair of transmitters with reference signals thereby to convert each of said first pairs of transmitters alternately from a position indicating signal transmitter to a link transmitter, and means for alternately rendering one or the other of said second pair of transmitters inoperative during the intervals when corresponding transmitters of said first pair are operating as link transmitters.

21. In a position indicating system of the type requiring the transmission of signals from both position indicating transmitters which radiate position indicating signals and link transmitters which radiate reference signals, a first pair of spaced transmitters for radiating position indicating signals, a second pair of spaced transmitters for radiating other position indicating signals, modulators individually associated with said first pair of transmitters and each operative to modulate the signal radiated by the associated transmitter with reference signals thereby to convert the associated transmitter into a link transmitter, switching means individually associated with said second pair of transmitters and each operative to render the associated transmitter inoperative, and signal generating means remote from all of said transmitters for successively rendering said modulators alternately effective to modulate the signals radiated by the respective associated first pair of transmitters with reference signals and for successively rendering said switching means alternately effective to deenergize the respective associated second pair of transmitters.

22. A wave signal receiving apparatus for translating received space radiated waves into position indications comprising a receiver for receiving first and second pairs of space radiated waves and for heterodyning said waves to produce first and second heterodyne signals having frequencies related to the difference frequencies between said first and second pairs of waves, said receiver being alternately operative to receive and reproduce first and second reference signals having frequencies representative of the difference frequency between third and fourth pairs of radiated waves and modulated upon one of said first pair of radiated waves, a second receiver for receiving and heterodyning said third and fourth pairs of radiated waves to produce third and fourth heterodyne signals having respective frequencies equalling the frequency of said first and second reference signals, said second receiver being alternately operative to receive and reproduce third and fourth reference signals having frequencies representative of the difference frequency between said first and second pairs of waves and modulated upon one of said third pair of waves, and phase measuring means for measuring the phase relationship between said first heterodyne and third reference signals, between said second heterodyne and fourth reference signals, between said third heterodyne and first reference signals and between said fourth heterodyne and second reference signals to provide four indications respectively representative of the position of said receiving apparatus relative to pairs of displaced sources of said waves.

23. A wave signal receiving apparatus for translating received space radiated waves into position indications comprising a receiver for receiving first and second pairs of space radiated waves and for heterodyning said waves to produce first and second heterodyne signals having frequencies related to the difference frequencies between said first and second pairs of waves, said receiver being alternately operative to receive and reproduce first and second reference signals having frequencies representative of the difference frequency between third and fourth pairs of radiated waves and modulated upon one of said first pair of radiated waves, a second receiver for receiving and heterodyning said third and fourth pairs of radiated waves to produce third and fourth heterodyne signals having respective frequencies equalling the frequency of said first and second reference signals, said second receiver being alternately operative to receive and reproduce third and fourth reference signals having frequencies representative of the difference frequency between said first and second pairs of waves and modulated upon one of said third pair of waves, a first phase measuring device for measuring the phase relationship between said first heterodyne signals and said third reference signals to provide an indication of the position of said receiving apparatus relative to the source of said first pair of waves, a second phase measuring device for measuring the phase relationship between said second heterodyne signal and said fourth reference signal to provide an indication of the position of said receiving apparatus relative to the source of a second pair of said waves, a third phase measuring apparatus for measuring the phase relationship between said third heterodyne signal and said first reference signal to provide an indication of the position of said receiving apparatus relative to the source of the third pair of waves, and a fourth phase measuring device for measuring the phase relationship between said fourth heterodyne signal and said second reference signal to provide an indication of the position of said receiving apparatus relative to the source of the fourth pair of waves.

24. A wave signal receiving apparatus for translating received space radiated waves into position indications comprising a receiver for receiving first and second pairs of space radiated waves and for heterodyning said waves to produce first and second heterodyne signals having frequencies related to the difference frequencies between said first and second pairs of waves, said receiver being alternately operative to receive and reproduce first and second reference signals having frequencies representative of the difference frequency between third and fourth pairs of radiated waves and modulated upon one of said first pair of radiated waves, a second receiver for receiving and heterodyning said third and fourth pairs of radiated waves to produce third and fourth heterodyne signals having respective frequencies equalling the frequency of said first and second reference signals, said second receiver being alternately operative to receive and reproduce third and fourth reference signals having frequencies representative of the difference frequency between said first and second pairs of waves and modulated upon one of said third pair of waves, phase measuring means for measuring the phase relationship between said first heterodyne and third reference signals, between said second heterodyne and fourth reference signals, between said third heterodyne and first reference signals and between said fourth heterodyne and second reference signals to provide four indications respectively representative of the position of said receiving apparatus relative to pairs of displaced sources of said waves, and filters coupled to the output sides of said receivers and tuned respectively to said heterodyne signals and to said reference signals for selectively passing said signals to said phase measuring devices in order to measure the phase relationship between different pairs of said signals.

25. Wave signal receiving apparatus for translating received space radiated waves into position indications comprising a first receiver for receiving a first group of three space radiated waves and for heterodyning said three waves to produce first and second heterodyne signals having frequencies related to the difference frequencies between individual pairs of waves of said first group, a second receiver for receiving a second group of three space radiated waves and for heterodyning said three waves to produce third and fourth heterodyne signals having frequencies related to the difference frequencies between individual pairs of waves of said second group, said first receiver being alternately operative to receive and reproduce first and second reference signals having frequencies representative of the difference frequencies between said pairs of waves of said second group and modulated upon one of the waves of said first group, said second receiver being alternately operative to receive and reproduce third and fourth reference signals having frequencies representative of the difference frequencies between said pairs of waves of said first group and modulated upon one of the waves of said second group, and phase measuring means for measuring reference signals, between said second heterodyne and fourth reference signals, between said third heterodyne and first reference signals and between said fourth heterodyne and second reference signals to provide four indications respectively representative of the position of said receiving apparatus relative to pairs of displaced sources of said waves.

26. Wave signal receiving apparatus for translating received spaced radiated waves into position indications comprising a first receiver for receiving a first group of three space radiated waves and for heterodyning said three waves to produce first and second heterodyne signals having frequencies related to the difference frequencies between individual pairs of waves of said first group, a second receiver for receiving a second group of three space radiated waves and for heterodyning said three waves to produce third and fourth heterodyne signals having frequencies related to the difference frequencies between individual pairs of waves of said second group, said first receiver being alternately operative to receive and reproduce first and second reference signals having frequencies representative of the difference frequencies between said pairs of waves of said second group and modulated upon one of the waves of said first group, said second receiver being alternately operative to receive and reproduce third and fourth reference signals having frequencies representative of the difference frequencies between said pairs of waves of said first group and modulated upon one of the waves of said second group, a first phase measuring device for measuring the phase relationship between said first heterodyne and third reference signal to provide an indication of the position of said receiving apparatus relative to the source of one pair of waves of said first group, a second phase measuring device for measuring the phase relationship between said second heterodyne signal and said fourth reference signal to provide an indication of the position of said receiving apparatus relative to the source of another pair of waves of said first group, a third phase measuring device for measuring the phase relationship between said third heterodyne signal and said first reference signal to provide an indication of the position of said receiving apparatus relative to the source of one pair of waves of said second group, and a fourth phase measuring device for measuring the phase relationship between said fourth heterodyne signal and said second reference signal to provide an indication of the position of said receiving apparatus relative to the source of another pair of waves of said second group.

No references cited.